(12) United States Patent
Carpenter

(10) Patent No.: US 9,550,136 B2
(45) Date of Patent: Jan. 24, 2017

(54) BYPASS VALVE TECHNOLOGY INTERFACE SAFETY SCREEN

(71) Applicant: Hamilton Sundstrand Corporation, Charlotte, NC (US)

(72) Inventor: Richard J. Carpenter, Gales Ferry, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 420 days.

(21) Appl. No.: 14/198,274

(22) Filed: Mar. 5, 2014

(65) Prior Publication Data

US 2015/0251114 A1    Sep. 10, 2015

(51) Int. Cl.
*B01D 35/14* (2006.01)
*B01D 29/01* (2006.01)
*B01D 27/10* (2006.01)
*B01D 35/147* (2006.01)

(52) U.S. Cl.
CPC ............. *B01D 29/01* (2013.01); *B01D 35/147* (2013.01); *B01D 27/103* (2013.01); *B01D 35/1475* (2013.01)

(58) Field of Classification Search
CPC .. B01D 35/147; B01D 35/1475; B01D 27/103
See application file for complete search history.

(56) References Cited

U.S. PATENT DOCUMENTS

| 3,898,063 | A | 8/1975 | Gazan |
|---|---|---|---|
| 3,993,561 | A | 11/1976 | Swearingen |
| 4,082,665 | A | 4/1978 | Schneider et al. |
| 6,423,215 | B1 | 7/2002 | Stein |
| 7,243,740 | B2 | 7/2007 | Frith |
| 8,501,012 | B2 | 8/2013 | Himmel |
| 2005/0103701 | A1 | 5/2005 | Bechtum et al. |
| 2011/0253607 | A1 | 10/2011 | Becker et al. |
| 2013/0200003 | A1 | 8/2013 | Becker et al. |

FOREIGN PATENT DOCUMENTS

EP    2377593 A1    10/2011

OTHER PUBLICATIONS

The United Kingdom Search Report mailed Oct. 7, 2015 for United Kingdom Patent Application No. GB1503595.9.

*Primary Examiner* — Terry Cecil

(74) *Attorney, Agent, or Firm* — Kinney & Lange, P.A.

(57) ABSTRACT

A safety screen assembly includes a shroud sleeve with an upstream end that defines a flow inlet. A spring seat is disposed downstream from the shroud sleeve and includes a flow outlet. A screen spool is operatively disposed between the flow inlet and the flow outlet and includes a tubular body with an inner passage, a screen disposed within the inner passage, and a plurality of bypass passages formed in the tubular body. The tubular body is in sliding engagement with the shroud sleeve in both a first position and a second position, the shroud sleeve closing the plurality of bypass passages from fluid flow when the tubular body is in the first position, and the plurality of bypass passages being open to fluid flow when the tubular body is in the second position. A spring biases the tubular body of the screen spool toward the first position.

11 Claims, 3 Drawing Sheets

BYPASS VALVE TECHNOLOGY INTERFACE SAFETY SCREEN

BACKGROUND

The present invention relates to filtration of fluid systems and more specifically to filtration in lubrication systems for gas turbine engines.

In pressurized fluid systems, such as a lubrication system or a fuel system in a gas turbine engine, fluid is directed through a network of passages to specified regions of a machine to serve numerous functions, such as lubrication and cooling. In a gas turbine engine, the lubrication system directs a substantial volume of a lubricating fluid to engine bearing compartments to provide the necessary lubrication and cooling of the bearings contained therein. This lubricating fluid may carry a residual quantity of particulate matter, such as metallic filings, sediments, or other solids generated by material wear occurring at sliding or impacting surfaces within the bearing compartments and other internal components of the gas turbine engine.

It is well known that filtering particulate matter from the lubricating fluid can minimize the wear to bearings and other internal components in the gas turbine engine. Particulate matter is filtered from the lubricating fluid by a screen or other filter positioned along the passages of the lubrication system. Over time, these filters and screens can become partially or fully blocked by the particulate matter, thereby starving the downstream bearings and components of the pressure and flow of lubricating fluid that is required for proper function. In some prior art systems, the screens have been designed to burst at a predetermined pressure, so as to preserve a threshold pressure and flow of lubricating fluid to the bearings and other components to preserve proper function of the bearings and components. However, the particulate matter previously collected by the screens is introduced into the lubricating fluid when the screen bursts and can cause wear and reduced life to the bearings and components downstream.

SUMMARY

In one aspect, a safety screen assembly suitable for use within a fluid passage includes a shroud sleeve. The shroud sleeve includes an upstream end that defines a flow inlet of the safety screen assembly and a flange disposed at the upstream end of the shroud sleeve. A spring seat is disposed downstream from the shroud sleeve and includes a first flow outlet of the safety screen assembly. A screen spool is operatively disposed between the flange and the first flow outlet. The screen spool includes a tubular body with an inner passage, a first screen disposed within the inner passage, and a bypass passage formed in the tubular body. The tubular body is in sliding engagement with the shroud sleeve in both a first position and a second position. In the first position the tubular body engages the flange and the shroud sleeve closes the bypass passage from fluid flow. In the second position the tubular body is moved away from the flange and towards the first flow outlet and the bypass passage is open to fluid flow. A spring engages between the flow inlet and the first flow outlet of the safety screen assembly and biases the tubular body of the screen spool toward the flange of the shroud sleeve.

In another aspect, a safety screen assembly suitable for use within a fluid passage includes a shroud sleeve with an upstream end that defines a flow inlet of the safety screen assembly. A spring seat is disposed downstream from the shroud sleeve and includes a flow outlet of the safety screen assembly. A screen spool is operatively disposed between the flow inlet and the flow outlet and includes a tubular body with an inner passage, a screen disposed within the inner passage of the tubular body, and a plurality of bypass passages formed in the tubular body. The tubular body is in sliding engagement with the shroud sleeve in both a first position and a second position, the shroud sleeve closing the plurality of bypass passages from fluid flow when the tubular body is in the first position, and the plurality of bypass passages being open to fluid flow when the tubular body is in the second position. A spring is engaged between the screen spool and the spring seat biases the tubular body of the screen spool toward the first position.

Persons of ordinary skill in the art will recognize that other aspects and embodiments of the present invention are possible in view of the entirety of the present disclosure, including the accompanying figures.

Figure 1A:
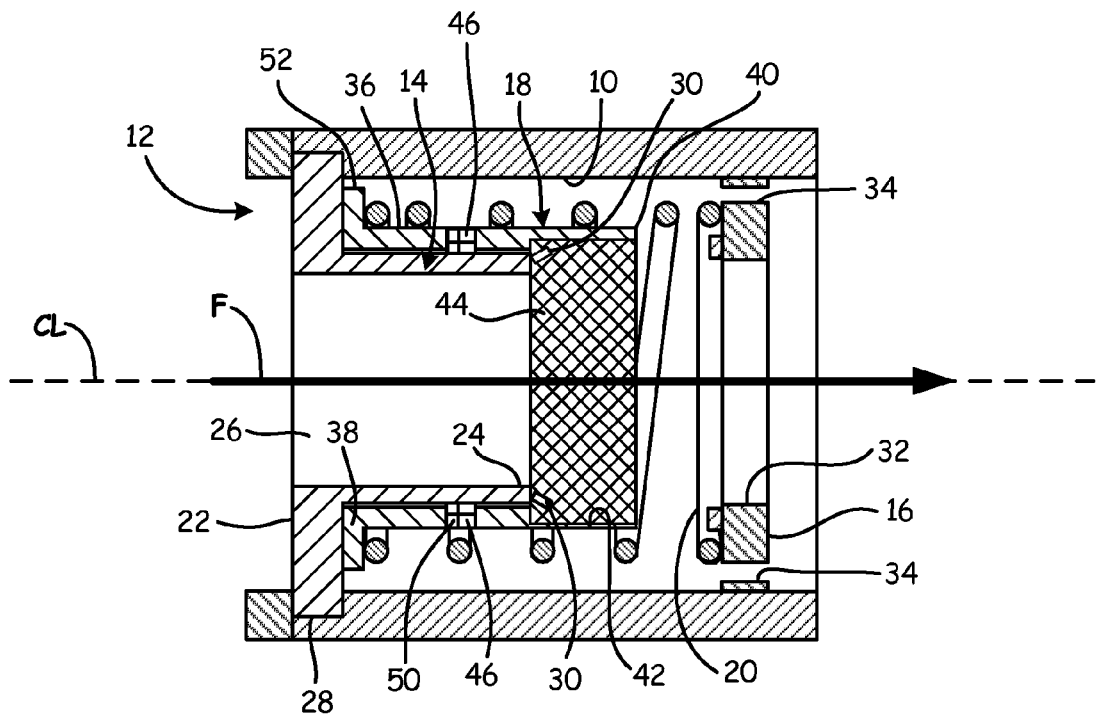
FIG. 1A is a cross-sectional view of an embodiment of a safety screen assembly for a fluid passage in a first position.

While the above-identified drawing figures set forth embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In at least some embodiments, the present invention relates generally to a safety screen assembly in a fluid passage, the safety screen assembly having a screen spool in sliding engagement with a shroud sleeve. The screen spool includes a screen for filtering a fluid flow inside the fluid passage and at least one bypass passage. During ordinary operation, the shroud sleeve closes the at least one bypass passage to the fluid flow while the fluid flow passes through the screen. Should the screen become clogged or obstructed, the screen spool can slide relative the shroud sleeve to open the at least one bypass passage to allow the fluid flow to bypass the screen. Persons of ordinary skill in the art will recognize additional features and benefits in view of the entirety of the present disclosure, including the accompanying figures.

Figure 1B:
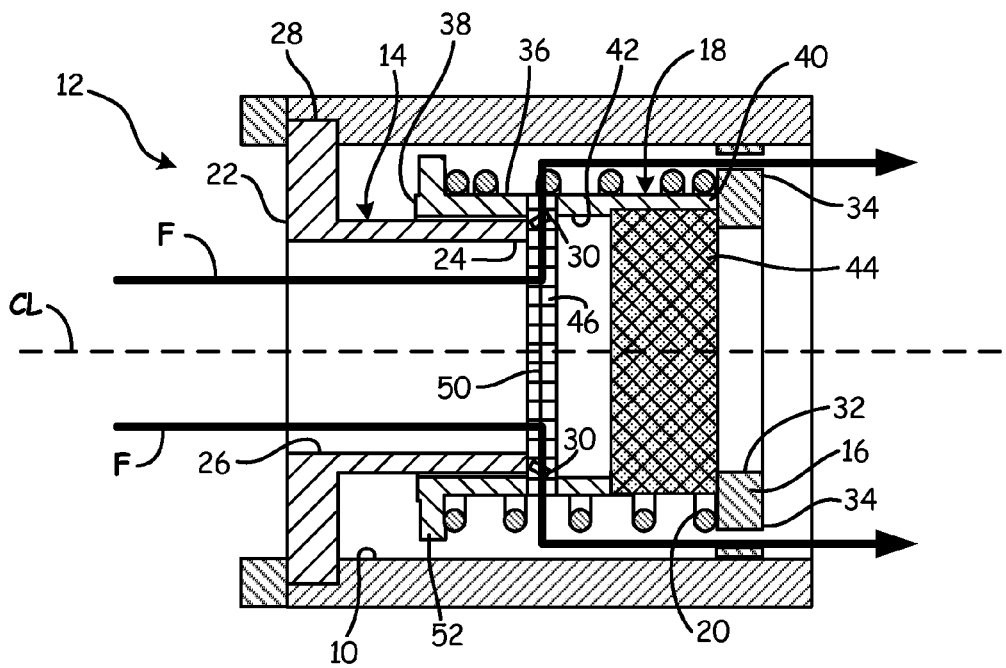
FIG. 1B is a cross-sectional view of the safety screen assembly of FIG. 1A in a second position.

FIGS. 1A and 1B will be discussed concurrently. FIG. 1A is a cross-sectional view of fluid passage 10 and one embodiment of safety screen assembly 12 disposed in fluid passage 10 and in a first position, and FIG. 1B is a cross-sectional view of safety screen assembly 12 of FIG. 1A in a second position. As shown in FIGS. 1A and 1B, safety screen assembly 12 can include shroud sleeve 14, spring seat 16, screen spool 18, spring 20, and central axis CL. Shroud sleeve 14 can include upstream end 22, downstream end 24, flow inlet 26, flange 28, and at least one resilient locking element 30. Spring seat 16 can include first flow outlet 32 and one or more second flow outlets 34. Screen spool 18 can include tubular body 36, first end 38, second end 40, inner passage 42, first screen 44, at least one bypass passage 46, second screen 50, and flange 52. Fluid flow F can flow within fluid passage 10 and can pass across safety screen assembly 12. Fluid passage 10 can be incorporated into a lubrication system or a fuel system of a gas turbine engine. Safety screen assembly 12 and fluid passage 10 can be disposed downstream from a main component of a gas turbine engine and a filter to serve as a last chance safety screen.

Shroud sleeve 14 can be disposed in fluid passage 10 and can extend between upstream end 22 and downstream end 24. As shown in FIGS. 1A and 1B, shroud sleeve 14 can have a tubular geometry that is generally aligned in an axial direction along central axis CL of safety screen assembly 12. Upstream end 22 of shroud sleeve 14 can define flow inlet 26 of safety screen assembly 12. Flange 28 can be formed at upstream end 22 of shroud sleeve 14 and can extend radially outward relative to central axis CL of the safety screen assembly 12. Flange 28 can engage a wall that defines fluid passage 10 such that shroud sleeve 14 is generally centered within fluid passage 10 and is generally restrained from moving within fluid passage 10.

Spring seat 16 can be positioned generally downstream from shroud sleeve 14 inside fluid passage 10. First flow outlet 32 of safety screen assembly 12 can be formed in spring seat 16 and can be centered on central axis CL of screen assembly 12. Second flow outlet 34 can be formed in spring seat 16 and can be positioned radially outward from first flow outlet 32. As shown in FIGS. 1A and 1B, a plurality of second flow outlets 34 are formed in spring seat 16 and positioned radially outward from first flow outlet 32. Spring seat 16 can also engage fluid passage 10 such that spring seat 16 is generally centered within fluid passage 10 and is generally restrained from moving within fluid passage 10.

Tubular body 36 of screen spool 18 can extend between first end 38 and second end 40 of screen spool 18 and can be operatively disposed axially between flange 28 of shroud sleeve 14 and first flow outlet 32 of spring seat 16. Inner passage 42 can extend generally in an axial direction across tubular body 36. Downstream end 24 of shroud sleeve 14 can be disposed inside inner passage 42 of tubular body 36 of screen spool 18 such that tubular body 36 of the screen spool 18 slides over at least a portion of shroud sleeve 14 and is in sliding engagement around shroud sleeve 14. Spring seat 16 and flange 28 of shroud sleeve 14 can each have an outer diameter greater than a diameter of inner passage 42 of tubular body 36 of screen spool 18 so as to maintain the axial movement of screen spool 18 between flange 28 and spring seat 16. Spring seat 16 can be spaced downstream from flange 28 of shroud sleeve 14 a distance less than twice an axial length of tubular body 36 of screen spool 18, and downstream end 24 of shroud sleeve 14 can extend axially approximately midway between flange 28 and spring seat 16, such that tubular body 36 of screen spool 18 is always in sliding engagement with shroud sleeve 14 regardless of a position of screen spool 18 between flange 28 and spring seat 16. Flange 52 of tubular body 36 can be formed at first end 38 of screen spool 18 and can extend radially outward from tubular body 36. As discussed below, flange 52 can allow spring 20 to engage screen spool 18.

Figure 2A:
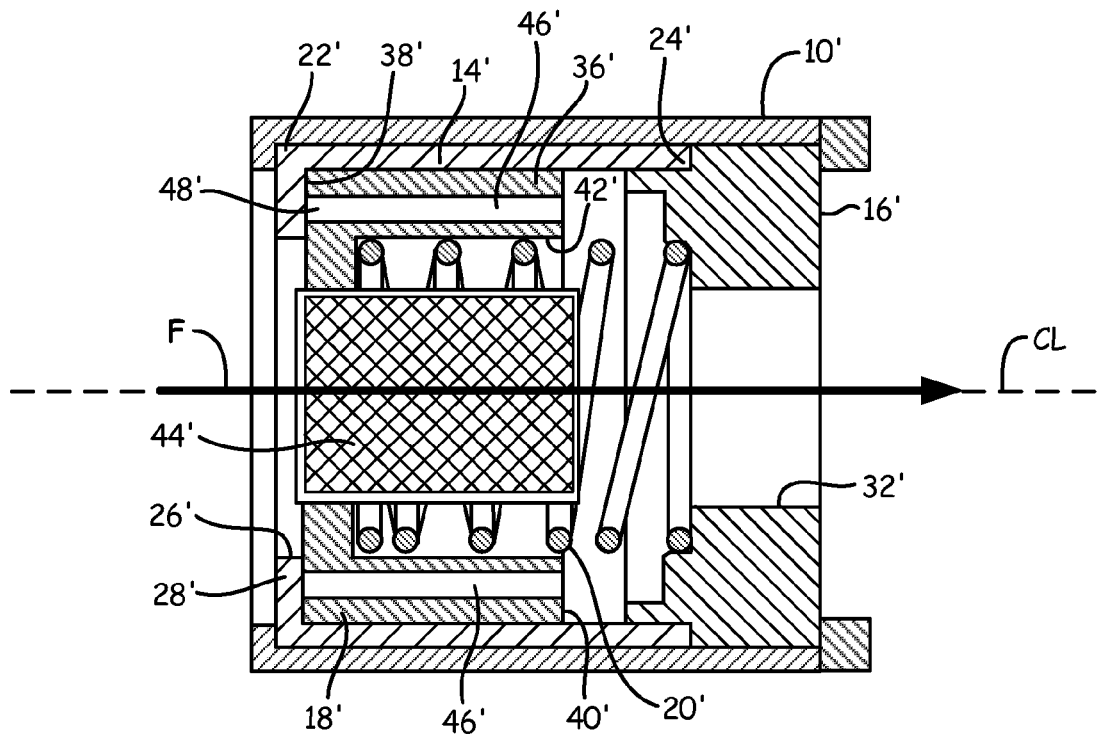
FIG. 2A is a cross-sectional view of another embodiment of a safety screen assembly for a fluid passage in a first position.

Spring 20 can be disposed between flow inlet 26 and first flow outlet 32 of safety screen assembly 12, and can be disposed around tubular body 36 of screen spool 18. As shown in FIGS. 1a and 2a, spring 20 can engage flange 52 of screen spool 18 and spring seat 16 such that spring 20 biases tubular body 36 of screen spool 18 toward flange 28 of shroud sleeve 14. As shown in FIG. 1A, tubular body 36 of screen spool 18 can be in a first position when spring 20 pushes tubular body 36 toward flange 28 of shroud sleeve 14 such that first end 38 of tubular body 36 engages flange 28. As shown in FIG. 1B, tubular body 36 of screen spool 18 can be in a second position when spring 20 is compressed and second end 40 of tubular body 36 engages spring seat 16. Tubular body 36 can maintain sliding engagement with shroud sleeve 14 in both the first position and the second position. Because tubular body 36 can maintain sliding engagement with shroud sleeve 14 in both the first position and the second position, shroud sleeve 14 can laterally guide and support tubular body 36 continuously during operation of safety screen assembly 12. Because shroud sleeve 14 can laterally guide and support tubular body 36 continuously, shroud sleeve 14 can protect tubular body 36 during operation against misalignment and wear that might arise from vibrations and impulsive forces caused by vortex shedding as fluid passes through safety screen assembly 12. Flange 28 of shroud sleeve 14 also helps protect against debris entering the sliding path between tubular body 36 and shroud sleeve 14 and causing the tubular body 36 to stick or bind with the shroud sleeve 14.

First screen 44 can be disposed within inner passage 42 proximate second end 40 of tubular body 36 of screen spool 18 and can be sized to fill inner passage 42 at second end 40. At least one bypass passage 46 can be formed in tubular body 36. As shown in FIGS. 1A and 1B, the at least one bypass passage 46 can extend radially through tubular body 36 of screen spool 18 and can be disposed upstream from first screen 44. As shown in FIG. 1A, shroud sleeve 14 can cover an opening of the at least one bypass passage 46 when tubular body 36 of screen spool 18 is in the first position. When tubular body 36 is in the second position, the at least one bypass passage 46 can be open and exposed to inner passage 42 of shroud sleeve 14. In this way, fluid flow through bypass passage(s) 46 is substantially prevented when tubular body 36 is in the first position, and fluid flow through bypass passage(s) 46 is allowed when tubular body 36 is in the second position.

During operation of safety screen assembly 12, when tubular body 36 is in the first position, fluid flow F can enter safety screen assembly 12 by flow inlet 26, and can be directed towards first screen 44 by inner passage 42 of screen spool 18 and by shroud sleeve 14. As fluid flow F passes through first screen 44, first screen 44 can filter and capture particulate matter that may be present in fluid flow F. After fluid flow F passes through first screen 44, fluid flow F can exit safety screen assembly 12 primarily through first flow outlet 32 of spring seat 16. As particulate matter accumulates in or on first screen 44, fluid flow F across first screen 44 can experience an increase in frictional losses and resistance, thereby restricting fluid flow F across first screen 44 causing back pressure to develop in fluid flow F upstream of first screen 44. Should fluid flow F across first screen 44 become sufficiently restricted, as shown in FIG. 1B, the back pressure developed in fluid flow F upstream from first screen 44 can compress spring 20 and move screen spool 18 to the second position, thereby exposing the at least one bypass passage 46 to inner passage 42 and fluid flow F. While FIG. 1B shows that fluid flow F across first screen 44 is completely blocked, it is not necessary that fluid flow F across first screen 44 be completely blocked before the back pressure upstream of first screen 44 opens the at least one bypass passage 46. Furthermore, while FIGS. 1A and 1B show screen spool 18 moving between the first and second positions, it is understood that screen spool 18 can modulate to intermediate positions between the first and second positions as a function of the resistance of fluid flow F across first screen 44. Once the at least one bypass passage 46 is opened to fluid flow F, fluid flow F can flow across bypass passage 46, flow between tubular body 36 and fluid passage 10, and exit safety screen assembly 12 through the plurality of second flow outlets 34. Because fluid flow F can exit safety screen assembly 12 via the at least one bypass passage 46 and the plurality of second flow outlets 34, fluid flow F can continue to flow continuously across safety screen assembly 12 to any device or machine component connected to fluid passage 10 should first screen 44 become clogged by particulate matter. Bypass passage 46 can also reduce the likelihood that the back pressure in fluid flow F will increase to the point of rupturing first screen 44 and releasing the previously captured particulate matter back into fluid flow F downstream from safety screen assembly 12. In some embodiments, first screen 44 can be designed to rupture at a predetermined maximum back pressure. As previously discussed above, tubular body 36 can maintain sliding engagement with shroud sleeve 14 in both the first position and the second position, thereby being guided by shroud sleeve 14 and supported by shroud sleeve 14 against undesirable forces and vibrations that possibly can occur due to vortex shedding as fluid flow F passes through safety screen assembly 12. Because the sliding engagement between shroud sleeve 14 and tubular body 36 allows bypass passage 46 to open as needed to relieve back pressure behind first screen 44 and to maintain an adequate pressure of fluid flow F to downstream components, it is important to protect the sliding engagement between shroud sleeve 14 and tubular body 36 against debris. Flange 28 of shroud sleeve 14 can be larger in diameter than tubular body 36 such that flange 28 covers and helps protect the sliding path between tubular body 36 and shroud sleeve 14 against debris that might enter therein and cause the tubular body 36 to stick or bind with the shroud sleeve 14.

Figure 1C:
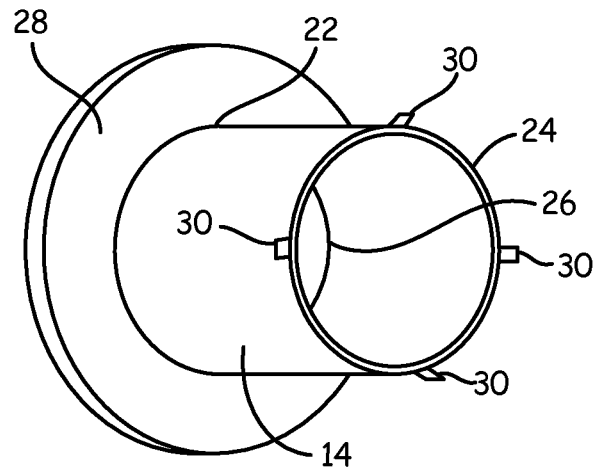
FIG. 1C is a perspective view of a shroud sleeve of the safety screen assembly of FIGS. 1A and 1B.
Figure 1D:
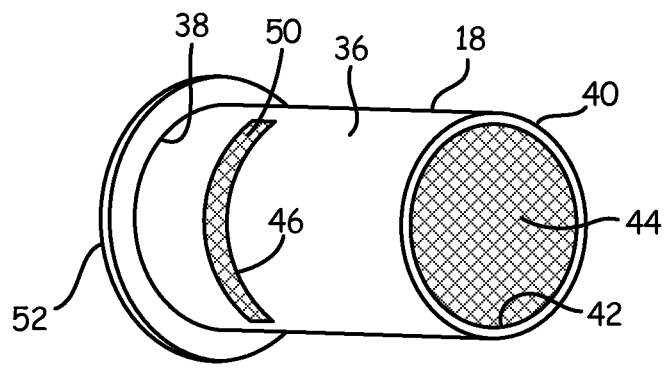
FIG. 1D is a perspective view of a screen spool of the safety screen assembly of FIGS. 1A and 1B.
Figure 1E:
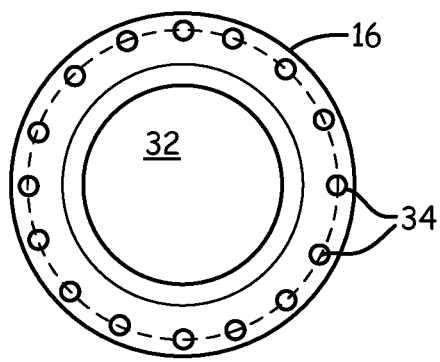
FIG. 1E is a front view of a spring seat of the safety screen assembly of FIGS. 1A and 1B.

Second screen 50 can be disposed at bypass passage 46 and can reduce the likelihood of particulate matter exiting safety screen assembly 12 through bypass passage 46. The at least one resilient locking element 30 can be disposed at or near downstream end 24 of shroud sleeve 14. The at least one resilient locking element 30 can extend into tubular body 36 when tubular body 36 is moved away from flange 28 of shroud sleeve 14 and towards first flow outlet 32 of spring seat 16. As shown in FIGS. 1A and 1B, the at least one resilient locking element 30 can be a detent that extends axially downstream from downstream end 24 of shroud sleeve 14 and can be biased radially outward from downstream end 24 of shroud sleeve 14. When tubular body 36 is in the second position, as shown in FIG. 1A, the at least one resilient locking element 30 can extend into bypass passage 46 to resist or prevent spring 20 from decompressing and closing the at least one bypass passage 46 should fluid flow F be stopped or interrupted. Because the at least one resilient locking element 30 can keep the at least one bypass passage 46 open should first screen 44 become clogged with particulate matter, the back pressure in fluid flow F does not have to build back up and overcome spring 20 before fluid flow F can pass through safety screen assembly 12 in the event fluid flow F is stopped and restarted. By keeping the at least one bypass passage 46 open should first screen become clogged, the at least one resilient locking element 30 also prevents tubular body 36 from getting stuck in a partial position where the at least one bypass passage 46 is not sufficiently open to relieve back pressure and prevent safety screen assembly 12 from rupturing. FIGS. 1C-1E, discussed below, provide additional views of shroud sleeve 14, spring seat 16, and screen spool 18 as described above with reference to FIGS. 1A and 1B.

FIG. 1C is a perspective view of shroud sleeve 14 of safety screen assembly 12 of FIGS. 1A and 1B. As shown in FIG. 1C, the at least one resilient locking element 30 can include four detents that extend axially downstream from downstream end 24 of shroud sleeve 14 and that are biased radially outward from downstream end 24 of shroud sleeve 14. Other configurations and arrangements can be used in alternative embodiments.

FIG. 1D is a perspective view of screen spool 18 of safety screen assembly 12 of FIGS. 1A and 1B. As shown in FIG. 1D, the at least one bypass passage 46 can be formed as a window, or multiple windows, that extend generally radially through tubular body 36 of screen spool 18, though the windows could be canted, angled, curved, etc. in further embodiments. The at least one bypass passage 46 can have a smaller flow area than inner passage 42 of tubular body 36. Second screen 50, disposed at the at least one bypass passage 46, can have a coarser mesh than first screen 44, especially in the embodiments where the at least one bypass passage 46 has a smaller flow area than inner passage 42, so that second screen 50 produces less flow resistance than first screen 44. Other configurations and arrangements can be used in alternative embodiments.

FIG. 1E is a front view of spring seat 16 of safety screen assembly 12 of FIGS. 1A and 1B. As shown in FIG. 1E, the plurality of second flow outlets 34 can be circumferentially arrayed around first flow outlet 32. The plurality of second flow outlets 34 can be radially spaced outward from first flow outlet 32 such that second end 40 of tubular body 36 of screen spool 18 can contact spring seat 16 between first flow outlet 32 and the plurality of second flow outlets 34 without obstructing the second plurality of flow outlets 34. The second plurality of flow outlets 34 can straighten and realign fluid flow F before it exits safety screen assembly 12. By straightening fluid flow F before it exits safety screen assembly 12, second plurality of flow outlets 34 decrease the degree of turbulence and recirculation in fluid flow F behind first screen 44 that could possibly agitate and stir the debris collected by first screen 44. Agitating and stirring the debris collected by first screen 44 could possibly allow the debris to escape first screen 44 and flow downstream. While safety screen assembly 12 has been described with reference to the embodiment shown in FIGS. 1A-1E, safety screen assembly 12 can include additional embodiments, as discussed below with reference to FIGS. 2A and 2B.

Figure 2B:
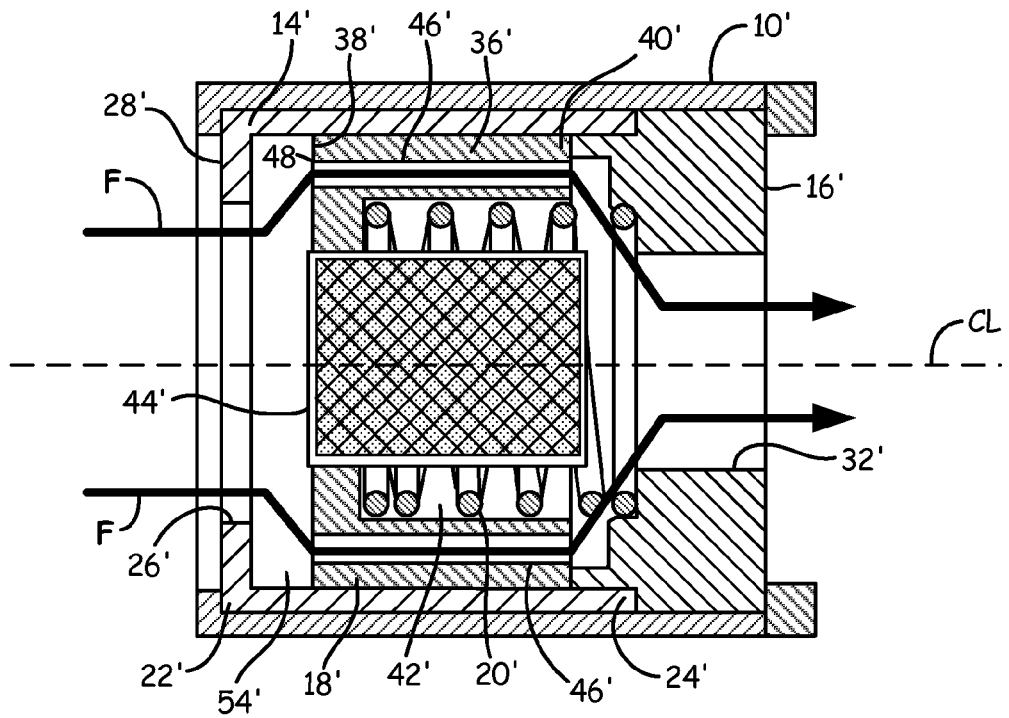
FIG. 2B is a cross-sectional view of the safety screen assembly of FIG. 2A in a second position.

FIG. 2A is a cross-sectional view of another embodiment of safety screen assembly 12' disposed in fluid passage 10' in the first position, and FIG. 2B is a cross-sectional view of safety screen assembly 12' of FIG. 2A in the second position. Like reference numbers and designations between FIGS. 1A-1E and FIGS. 2A-2B indicate like or similar elements, with prime designations added to elements shown in FIGS. 2A-2B. As shown in FIGS. 2A and 2B, flange 28' of shroud sleeve 14' can extend radially inward at upstream end 22' of shroud sleeve 14' and can define flow inlet 26'. Screen spool 18' can be disposed within shroud sleeve 14' and in sliding engagement with shroud sleeve 14'. A plurality of bypass passages 46' can extend axially through tubular body 36' of screen spool 18'. The plurality of bypass passages 46' can be disposed radially outward from inner passage 42' and can also be generally parallel to inner passage 42'. Spring 20' can be disposed between flange 52' of screen spool 18 and spring seat 16' and around first screen 44'.

When tubular body 36' of screen spool 18' is in the first position, as shown in FIG. 2A, flange 28' of shroud sleeve 14' can contact first end 38' of tubular body 36' and can cover and protect an opening of each of the plurality of bypass passages 46'. When tubular body 36' is in the second position, as shown in FIG. 2B, second end 40' of tubular body 36' can contact spring seat 16' and gap 54' can exist between first end 38' of tubular body 36' and flange 28' of shroud sleeve 14' so that fluid flow F can enter the plurality of bypass passages 46' and bypass first screen 44' in the event that first screen 44' should become clogged or obstructed.

Possible Benefits:

Persons of ordinary skill in the art will recognize that safety screen assembly 12 of the present invention can provide numerous advantages and benefits. Some examples of those advantages and benefits are as follows. Bypass passage 46 can allow fluid flow F to exit safety screen assembly 12 should first screen 44 become clogged by particulate matter, thereby allowing fluid flow F to continue flowing continuously across safety screen assembly 12 to any device or machine component connected to fluid passage 10. The second plurality of flow outlets 34 can straighten and realign fluid flow F before it exits safety screen assembly 12 to decrease the degree of turbulence and recirculation behind first screen 44 that could possibly agitate and stir the debris collected by first screen 44. Bypass passage 46 can also reduce the likelihood that back pressure in fluid flow F will increase to the point of rupturing first screen 44 and releasing particulate matter captured by first screen 44 back into fluid flow F. Shroud sleeve 14 also constantly provides support against vortex shedding to screen spool 18 in both the first and second position, thereby increasing the life and performance of safety screen assembly 12. Flange 28 of shroud sleeve 14 is beneficial because it helps protect against debris entering the sliding path between tubular body 36 and shroud sleeve 14 and causing the tubular body 36 to stick or bind with the shroud sleeve 14. The at least one resilient locking element 30 is beneficial because it can keep the at least one bypass passage 46 open should first screen 44 become clogged with particulate matter, thereby allowing fluid F to pass through safety screen assembly 12 in the event fluid flow F is stopped and restarted, without having to wait for pressure to back up in fluid flow F to compress spring 20.

Discussion of Possible Embodiments

The following are non-exclusive descriptions of possible embodiments of the present invention.

In one embodiment, a safety screen assembly suitable for use within a fluid passage includes a shroud sleeve. The shroud sleeve includes an upstream end that defines a flow inlet of the safety screen assembly and a flange disposed at the upstream end of the shroud sleeve. A spring seat is disposed downstream from the shroud sleeve and includes a first flow outlet of the safety screen assembly. A screen spool is operatively disposed between the flange and the first flow outlet. The screen spool includes a tubular body with an inner passage, a first screen disposed within the inner passage, and a bypass passage formed in the tubular body. The tubular body is in sliding engagement with the shroud sleeve in both a first position and a second position. In the first position the tubular body engages the flange and the shroud sleeve closes the bypass passage from fluid flow. In the second position the tubular body is moved away from the flange and towards the first flow outlet and the bypass passage is open to fluid flow. A spring engages between the flow inlet and the first flow outlet of the safety screen assembly and biases the tubular body of the screen spool toward the flange of the shroud sleeve.

The assembly of the preceding paragraph can optionally include, additionally and/or alternatively, any one or more of the following features, configurations and/or additional components:

the shroud sleeve further includes a downstream end disposed inside the inner passage of the tubular body of the screen spool, wherein the tubular body of the screen spool is in sliding engagement over at least a portion of the shroud sleeve and is laterally supported by the shroud sleeve.

the bypass passage extends radially through the tubular body of the screen spool and is disposed upstream from the first screen;

the flange extends radially outward relative to a central axis of the safety screen assembly and has an outer diameter greater than a diameter of the inner passage of the tubular body of the screen spool;

the shroud sleeve further includes at least one resilient locking element disposed at or near a downstream end of the shroud sleeve, wherein the at least one resilient locking element extends into the tubular body when the tubular body is moved away from the flange and towards the first flow outlet of the spring seat;

the at least one resilient locking element is a detent that extends axially downstream from the downstream end of the shroud sleeve and is biased radially outward from the downstream end of the shroud sleeve;

the at least one resilient locking element extends into the bypass passage when the tubular body is moved away from the flange and towards the first flow outlet of the spring seat;

the screen spool further includes a second screen disposed at the bypass passage;

the second screen includes a coarser mesh than the first screen;

the spring seat further includes a second flow outlet, wherein the first flow outlet is centered on the central axis of the safety screen assembly and the second flow outlet is disposed radially outward from the first flow outlet; and/or the bypass passage fluidically communicates with the second flow outlet when the tubular body is moved away from the flange and towards the first flow outlet of the spring seat.

In another embodiment, a safety screen assembly suitable for use within a fluid passage includes a shroud sleeve with an upstream end that defines a flow inlet of the safety screen assembly. A spring seat is disposed downstream from the shroud sleeve and includes a flow outlet of the safety screen assembly. A screen spool is operatively disposed between the flow inlet and the flow outlet and includes a tubular body with an inner passage, a screen disposed within the inner passage of the tubular body, and a plurality of bypass passages formed in the tubular body. The tubular body is in sliding engagement with the shroud sleeve in both a first position and a second position, the shroud sleeve closing the plurality of bypass passages from fluid flow when the tubular body is in the first position, and the plurality of bypass passages being open to fluid flow when the tubular body is in the second position. A spring is engaged between the screen spool and the spring seat biases the tubular body of the screen spool toward the first position.

The assembly of the preceding paragraph can optionally include, additionally and/or alternatively, any one or more of the following steps, features, and/or configurations:

the screen spool is disposed within the shroud sleeve;

the plurality of bypass passages extend axially through the tubular body of the screen spool and the plurality of bypass passages are disposed radially outward from the inner passage and are generally parallel to the inner passage; and/or the shroud sleeve includes a radially inward extending flange disposed at the upstream end of the shroud sleeve that covers an opening of each of the plurality of bypass passages when the tubular body of the screen spool is at the upstream position.

Summation

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A safety screen assembly suitable for use within a fluid passage, the safety screen assembly comprising:
    a shroud sleeve, the shroud sleeve comprising:
        an upstream end that defines a flow inlet of the safety screen assembly; and
        a flange disposed at the upstream end of the shroud sleeve;
    a spring seat disposed downstream from the shroud sleeve, the spring seat comprising:
        a first flow outlet of the safety screen assembly;
    a screen spool, the screen spool operatively disposed between the flange and the first flow outlet, the screen spool comprising:
        a tubular body with an inner passage;
        a first screen disposed within the inner passage; and
        a bypass passage formed in the tubular body,
        wherein the tubular body is in sliding engagement with the shroud sleeve in both a first position and a second position, wherein in the first position the tubular body engages the flange and the shroud sleeve closes the bypass passage from fluid flow, and wherein in the second position the tubular body is moved away from the flange and towards the first flow outlet and the bypass passage is open to fluid flow; and
    a spring engaged between the flow inlet and the first flow outlet of the safety screen assembly, the spring biasing the tubular body of the screen spool toward the flange of the shroud sleeve,
    wherein the shroud sleeve further comprises a downstream end disposed inside the inner passage of the tubular body of the screen spool, and wherein the tubular body of the screen spool is in sliding engagement over at least a portion of the shroud sleeve and is laterally supported by the shroud sleeve.

2. The assembly of claim 1, wherein the bypass passage extends radially through the tubular body of the screen spool and is disposed upstream from the first screen.

3. The assembly of claim 2, wherein the flange extends radially outward relative to a central axis of the safety screen assembly and has an outer diameter greater than a diameter of the inner passage of the tubular body of the screen spool.

4. The assembly of claim 1, wherein the shroud sleeve further comprises:
    at least one resilient locking element disposed at or near a downstream end of the shroud sleeve,
    wherein the at least one resilient locking element extends into the tubular body when the tubular body is moved away from the flange and towards the first flow outlet of the spring seat.

5. The assembly of claim 4, wherein the at least one resilient locking element is a detent that extends axially downstream from the downstream end of the shroud sleeve and is biased radially outward from the downstream end of the shroud sleeve.

6. The assembly of claim 4, wherein the at least one resilient locking element extends into the bypass passage when the tubular body is moved away from the flange and towards the first flow outlet of the spring seat.

7. The assembly of claim 4, wherein the screen spool further comprises:
    a second screen disposed at the bypass passage.

8. The assembly of claim 7, wherein the second screen comprises a coarser mesh than the first screen.

9. The assembly of claim 1, wherein the spring seat further comprises:
    a second flow outlet,
    wherein the first flow outlet is centered on the central axis of the safety screen assembly and the second flow outlet is disposed radially outward from the first flow outlet.

10. The assembly of claim 9, wherein the bypass passage fluidically communicates with the second flow outlet when the tubular body is moved away from the flange and towards the first flow outlet of the spring seat.

11. A safety screen assembly suitable for use within a fluid passage, the safety screen assembly comprising:
    a shroud sleeve, the shroud sleeve comprising:
        an upstream end that defines a flow inlet of the safety screen assembly;
    a spring seat disposed downstream from the shroud sleeve, the spring seat comprising:
        a flow outlet of the safety screen assembly;
    a screen spool, the screen spool operatively disposed between the flow inlet and the flow outlet, the screen spool comprising:
        a tubular body with an inner passage;
        a screen disposed within the inner passage of the tubular body; and a plurality of bypass passages formed in the tubular body, wherein the plurality of bypass passages extend axially through the tubular body of the screen spool and the plurality of bypass passages are disposed radially outward from the inner passage and are generally parallel to the inner passage, wherein the tubular body is in sliding engagement with the shroud sleeve in both a first position and a second position, the shroud sleeve closing the plurality of bypass passages from fluid flow when the tubular body is in the first position, and the plurality of bypass passages being open to fluid flow when the tubular body is in the second position, and wherein the screen spool is disposed within the shroud sleeve; and a spring engaged between the screen spool and the spring seat, the spring biasing the tubular body of the screen spool toward the first position, wherein the shroud sleeve includes a radially inward extending flange disposed at the upstream end of the shroud sleeve that covers an opening of each of the plurality of bypass passages when the tubular body of the screen spool is at the first position.

\* \* \* \* \*